(12) United States Patent
Fazakas

(10) Patent No.: US 6,859,015 B1
(45) Date of Patent: Feb. 22, 2005

(54) CENTRAL CONTROL UNIT FOR CONTROLLING THE CHARGING PROCESS OF A BATTERY

(76) Inventor: András Fazakas, H-1068 Budapest, Benczúr u. 39/b., Budapest (HU), 1068

( * ) Notice: Subject to any disclaimer, the term of this patent is extended or adjusted under 35 U.S.C. 154(b) by 366 days.

(21) Appl. No.: 10/031,103

(22) PCT Filed: Jul. 13, 2000

(86) PCT No.: PCT/HU00/00073
§ 371 (c)(1),
(2), (4) Date: Jan. 10, 2002

(87) PCT Pub. No.: WO01/06615
PCT Pub. Date: Jan. 25, 2001

(30) Foreign Application Priority Data
Jul. 15, 1999 (HU) .............................. 9902385

(51) Int. Cl.[7] .................................. H02J 7/16
(52) U.S. Cl. .................................... 320/150
(58) Field of Search ................. 320/150–153, 320/146, 156, 157, 159

(56) References Cited

U.S. PATENT DOCUMENTS

| | | | |
|---|---|---|---|
| 4,820,965 A | 4/1989 | Siemer | 320/165 |
| 5,410,238 A * | 4/1995 | Ishizuka et al. | 320/150 |
| 5,519,302 A | 5/1996 | Mino et al. | 320/148 |
| 5,583,871 A | 12/1996 | Simmonds et al. | 320/151 |
| 5,635,820 A | 6/1997 | Park | 320/148 |
| 5,796,255 A | 8/1998 | McGowan | 324/429 |
| 5,864,224 A * | 1/1999 | Takechi et al. | 320/152 |
| 6,114,839 A * | 9/2000 | Takano et al. | 320/150 |

FOREIGN PATENT DOCUMENTS

| | | |
|---|---|---|
| EP | 0760532 | 3/1997 |
| GB | 2251346 | 7/1992 |

* cited by examiner

*Primary Examiner*—Pia Tibbits
(74) *Attorney, Agent, or Firm*—Kirkpatrick & Lockhart L

(57) ABSTRACT

Central control unit for controlling the charging process of a battery that comprises:

a charger circuit coupled to the battery;

a circuit for conditionally prohibiting the charging process when predetermined conditions are met, the conditions comprise at least the condition of $T_B > T_{max}$, where $T_B$ designates the actual temperature of the battery and $T_{max}$ designates the highest permissible battery temperature, and the further condition when the change of one of the battery current and voltage dI and dU decreases in a predetermined time period below a predetermined threshold level; and a restart circuit for restarting the conditionally prohibited charging, comprising a plurality of inputs through which respective restart signals can be received, wherein a precondition of any restart is that the temperature of the battery $T_B$ being lower than an acceptable predetermined temperature $T_{ok}$.

9 Claims, 4 Drawing Sheets

CENTRAL CONTROL UNIT FOR CONTROLLING THE CHARGING PROCESS OF A BATTERY

The invention relates to a central control unit for controlling the charging process of a battery, that examines the existence of the conditions required for charging, and in accordance with the result of the examination enables or prohibits the charging process, and in given cases may change charging power.

The central control unit according to the invention is thus not the charger circuit but an independent unit that controls the charging which is a different complex process itself.

In charging batteries and especially if batteries of larger capacity are charged, the effect, that the charging process imposes on the battery, has an increased significance. If during the charging process the voltage, current, temperature or the time of the charging exceeds certain limit values, than it will result in damage to either the battery or in the charging circuit or the battery cannot be charged till the maximum of its capacity or its cycle life time decreases.

Most of the practically used charger circuits comprise a unit that performs a certain control function, that prevents the battery voltage during the charging process from exceeding a predetermined limit value. The designs capable of monitoring one or two parameters have simple circuitry but they cannot provide optimum conditions for the battery because the number of parameters that require inspection is much higher than actually monitored.

A limited multi-function condition system is monitored e.g. by the integrated circuit MC 33340P described in the Master Selection Guide publication SG 73/D Rev. 17, 1998 of Motorola Inc. This circuit monitors the decrease of the battery voltage, and the temperature and voltage of the battery. This charging circuit cannot be regarded sufficiently complex to be able to provide optimum conditions for the charging of the battery and for the user.

European patent publication EP 0 760 532 A1 describes a charging method for a secondary battery, by which the battery is prevented from being charged when its temperature is outside of a permitted range. The system does not deal with the optimization of the charging time and does not monitor a number of parameters which might cause harm to the battery when being outside of a permitted range.

U.S. Pat. No. 5,635,820 describes a battery charging control device which is intended primarily to lead acid batteries used generally in vehicles. This system functions according to a pre-selected charging method. There are respective algorythms associated with each charging methods that take into account the battery temperature and a predetermined end-of-charge condition. Charging is permitted only if the battery is in the permitted temperature range and the end-of-charge condition has not yet been reached. There are, however, numerous other parameters that should be monitored and should be taken into account when an optimized charging should be provided for a wide range of battery types.

The provision of appropriate conditions will have the higher significance the more one wishes to provide optimum conditions for the battery, whereas the claim for optimization covers the fulfillment of the request of the users, which includes primarily decreasing the charging time. In other words the battery should be charged in the possible shortest time to reach its maximum capacity, and the charging process should at the same time occur under optimum conditions for the battery. This task has been left so far unsolved even if given size capacity and type of batteries by conventional charging circuits. The solution of this task appears to be impossible if it is expected from the control unit to satisfy the above complex range of requirements in the case of batteries of different types, sizes and designs that require different charging conditions. The most difficult is the simultaneous monitoring of the temperature, the electrical limit values of the charging and of the end of charge moment, and providing an immediate and appropriate intervention if it is needed.

The object of the invention is to provide a central control unit for controlling the charge of a battery that has universal use, and which is capable of providing optimum conditions both for the battery and the user during the charging process.

According to the invention the objects have been attained by a central control unit structured according to the attached claims.

The central control unit according to the invention will now be described in connection with a preferable embodiment thereof, wherein reference will be made to the accompanying drawings. In the drawing.

The task of the central control unit is to start or to stop the charging of a battery B coupled to a charging circuit CH upon existence of appropriate conditions, and to provide for the battery B during the charging process to be in the permissible range of parameters.

Figure 1:
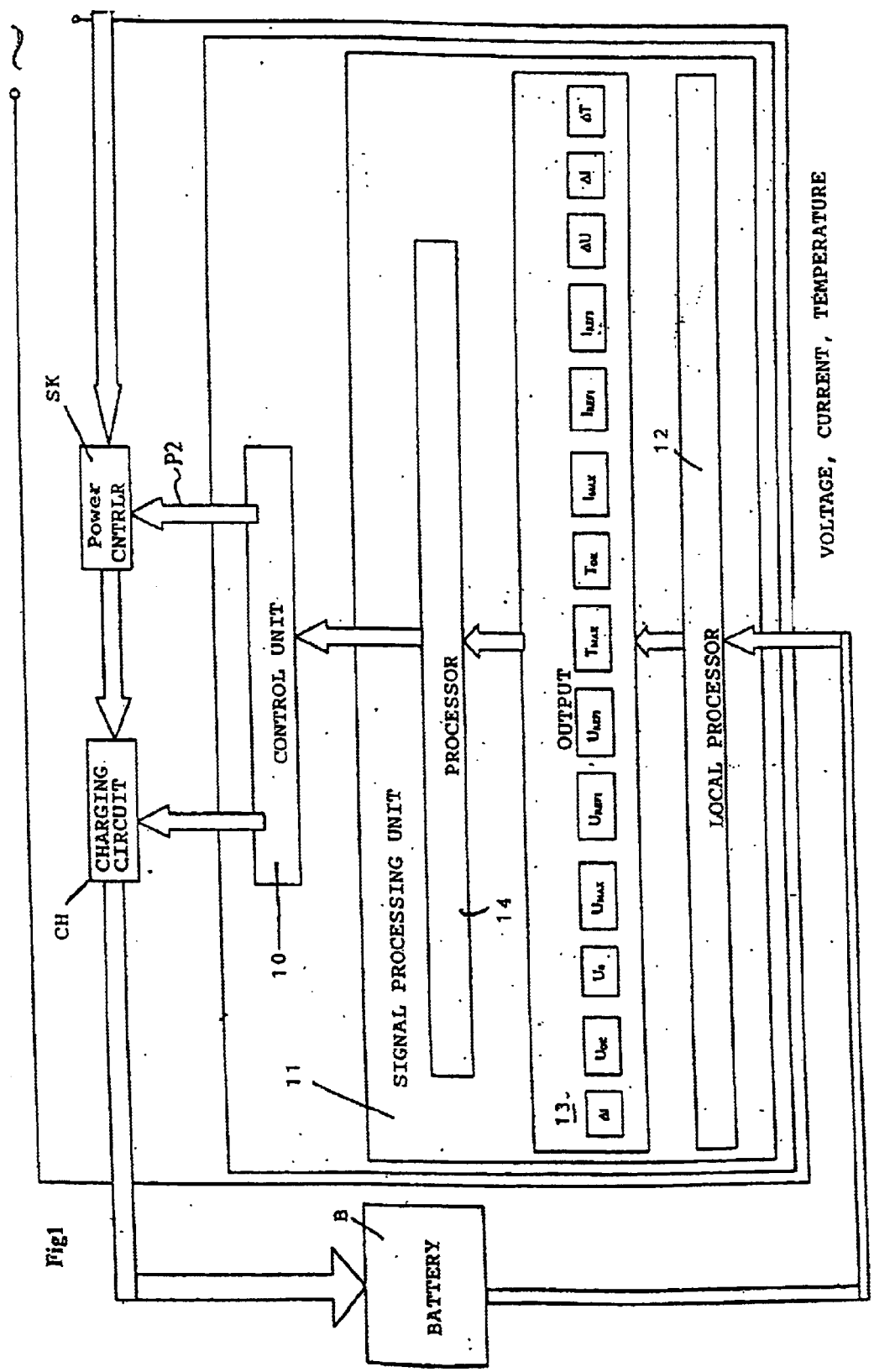
FIG. 1 is the functional block diagram of the central control unit.

FIG. 1 shows the functional block diagram of the central control unit, wherein the battery B is connected to a charging circuit CH. The charging circuit CH is switched on and off by a power controller SK that has controlled rising and declining slopes, operated by control unit 10 and connected between the line voltage and the supply side of the charging circuit CH. In the first mode of the central control unit instead of the power controller SK a simple switch controlled by the control unit 10 can be used, that switches the power line of the charging circuit CH. The control unit 10 performs the control function depending on the result of the signal processing which takes place in several stages. The input signals will be those that represent the momentary state of the battery B such as the voltage U, the charging current $I_{CH}$, temperature T which are fed back in the form of electrical signals to inputs of signal processing unit 11. In the signal processing unit 11 a local processing circuit 12 carries out a preliminary processing on the fed back signals, i.e. it establishes whether the values of the signals fall in respective permissible ranges or not. The next logical unit of the preliminary processing (comparison) is the entry of the limit values characteristics to the given type of battery and to the selected charging method, which can be regarded as adjustable external conditions from the point of view of the central control unit. FIG. 1 shows this function by the presence of a stage of external parameters 13. The actual signal processing takes place in a processing block 14 which takes into account a plurality of conditions and decides on the basis of the external parameters and of the fed back battery parameters whether intervention in the charging process is required and when this is the case what kind of intervention is needed.

Figure 2:
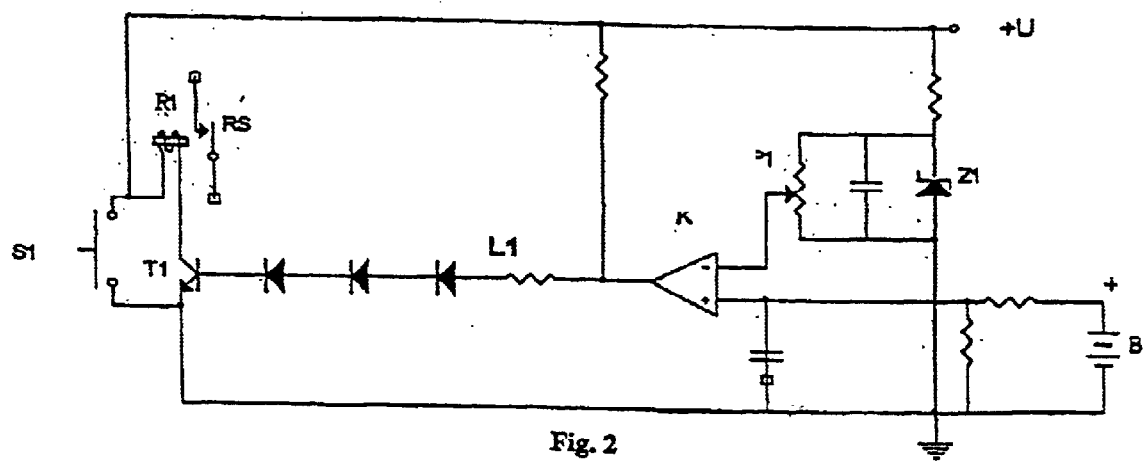
FIG. 2 is the circuit diagram of a circuit controlling the starting process.

FIG. 2 shows a portion of the central control unit that controls the starting process, in which for the case of clarity the power controller SK has been designated by contact RS of a relay R1 through which the line voltage is passed to the charger circuit CH.

The relay R1 is connected in the circuit of transistor T1 between the ground and an internal power voltage +U. The base of the transistor T1 receives from line L1 through a series connection of diodes either reverse of forward control voltage, wherein the series diode chain constitutes a voltage step. Between the collector and the emitter of the transistor T1 a manually operated switch S1 is provided to enable manual switching on of the relay R1 even if the transistor T1 is blocked.

A zener diode Z1 is connected between the supply voltage +U and the ground through a resistor, and coupled through potentiometer P1 to negative input of a comparator K to pass there a stabilized voltage $U_o$. This voltage is equal to the possible smallest voltage of the battery B to be charged. The positive input of the comparator K is connected through a voltage divider to the positive terminal of the battery B. The comparator K compares the actual voltage of the battery B with the voltage $U_o$, and provides a positive voltage at its output only if the condition $U_B > U_o$ is met. This condition (i.e. $U_B > U_o$) will not be applicable to any battery other than that which is defective or completely discharged and such batteries are likely to be inappropriate for being charged. By setting this condition for allowing the start of the charging process on the first hand it is indicated that the battery is not in a condition for being charged and on the other hand the charging circuit is protected. The positive voltage at the output of the comparator K sets the control line L1 through a resistor to this positive level, and under its effect the transistor T1 opens and allows the charging by pulling the relay R1. If the voltage of the battery does not reach the voltage level $U_o$, then a light emitting diode indicates this fact, and a zero level will prevail at the line L1, and the transistor T1 will cut off. It should be noted that during any normal charging process the comparator K has always a positive output voltage, and this condition will be upset only if the battery B is removed from the unit that returns the central control unit to initial state as will be described later. This protection remains operative even if during an ongoing charging process the battery B or a cell thereof gets shorted or an accidental short circuit occurs.

In case if the condition $U_B > U_o$ is not met but the operator is of the view that the battery is not defective, he can start the charging by the pressure of the switch S1. If by that time any of the stop conditions is fulfilled, the charging process will stop. In case if the battery is good but it had been deeply discharged, then under the effect of the charging voltage the comparator K will turn on into a positive state, and the charging process can be continued even if the switch S1 is released.

Figure 3:
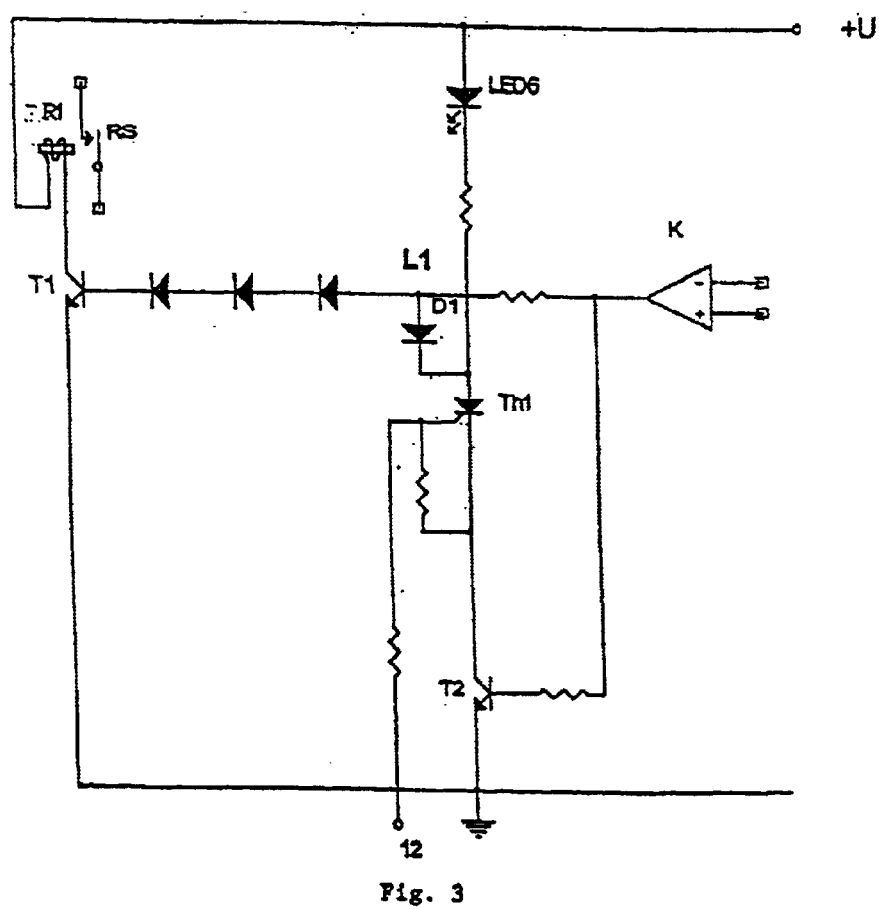
FIG. 3 is a portion of a circuit that ensures final stop of charge.

The circuit part associated with the final end of charge is shown in FIG. 3. The output of the comparator K is connected directly to base of a transistor T2, and depending on its state the transistor T2 is conductive or non-conductive. The collector of the transistor T2 is coupled to cathode of thyristor Th1, and the anode thereof is coupled through a resistor and a light emitting diode LED6 to the supply voltage +U. The control electrode of the thyristor Th1 is connected through a voltage divider to input 12 of the central control unit. Input 12 is connected to a current sensor circuit (not shown), and it will take a positive logical level if the charging current $I_{CH}$ of the battery B exceeds a maximum current $I_{max}$ determined for the actually used battery type. This condition will be met if the battery B becomes defective, e.g. it has a short circuit. Earlier it was described that during the charging process the output of the comparator K is at positive level, therefore the transistor T2 receives an open command and its collector is on the low (zero) level. In this way the full supply voltage +U will be present between the anode ands cathode electrodes of the thyristor Th1. In the moment when a positive voltage appears at the input 12 that represents the crossing of the maximum current, the thyristor Th1 is fired, it will conduct, and its anode pulls down the voltage of the control line L1 through the diode D1 that acts as a separation means. The low state of the line L1 immediately switches the transistor T1 off that finishes the charging. The series light emitting diode LED6 indicates the conductive state of the thyristor Th1. This conductive state can be finished by the removal of the battery only, since this constitutes the main condition for the change of state of the comparator K. The stop state caused by the crossing of the maximum current is final, there is no way of any restart.

Figure 4:
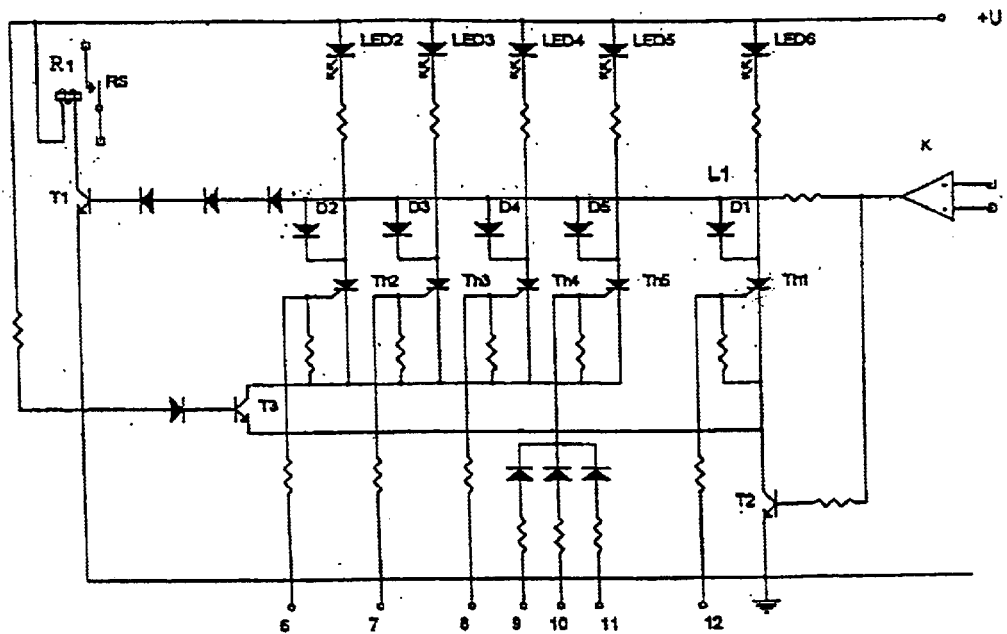
FIG. 4 is a sketch of the circuits providing conditional stops.

The circuit shown in FIG. 4 realizes the operational conditions of the signal-processing block 14. The collector of the transistor T2 (referred to earlier) is connected to emitter of transistor T3, and the base of this transistor T3 is coupled to the voltage +U, thus it receives a control to open state. The cathodes of four further thyristors Th2–Th5 are coupled to the collector of the transistor T3, and their anodes, like in case of the thyristor Th1, are coupled through respective resistors and light emitting diodes LED2–LED5 to the supply voltage +U. The control electrodes of the thyristors Th2–Th5 are coupled through respective voltage dividers to input terminals 6–11 of the unit. The control electrode of the fourth thyristor Th5 is connected through a decoupler using three diodes to three input terminals 9–11 for receiving individual stop condition signals. The usual stop conditions are e.g. the followings. Input terminal 6 is controlled if the temperature T of the battery B exceeds a permitted maximum temperature $T_{max}$. A separate temperature monitor circuit generates this signal. The input terminal 7 receives a control signal from a separate voltage monitor circuit when the actual battery voltage $U_B$ is higher than a predetermined maximum voltage $U_{bmax}$. The input terminal 8 is controlled if the end of charge condition has been reached. Depending on the charging mode this condition is met if the slope of change of the charging current $I_{ch}$ or of the battery voltage $U_B$ (dU or dI) decreases below a threshold level, and this condition is monitored by a separate voltage or current monitor circuit.

Figure 5:
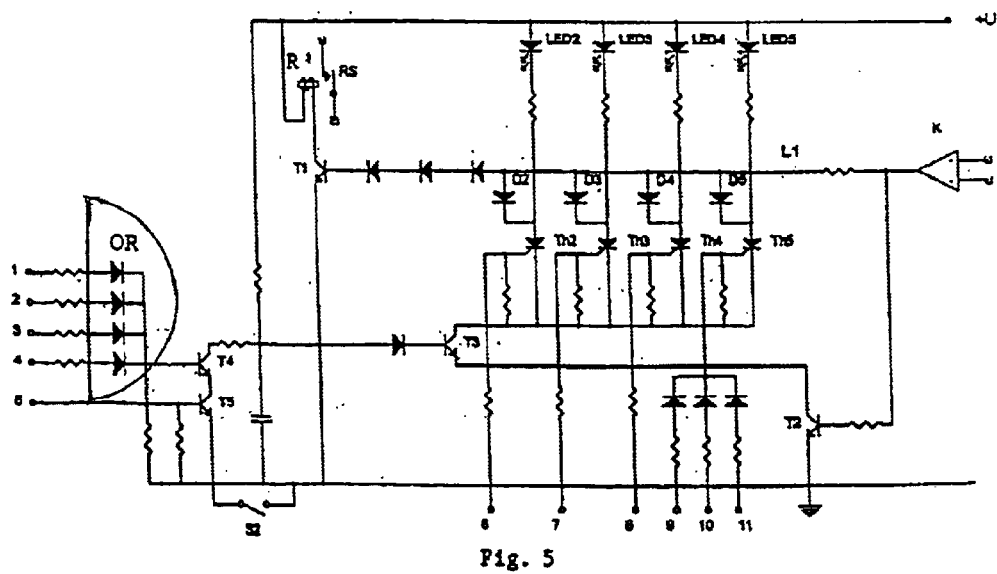
FIG. 5 is a portion of a circuit providing conditional automatic restart.

In initial state the transistor T3 obtains an open state control, thus its collector is at zero logical level. If a positive logical level will be present at any one of the input terminals 6 to 11, the thyristor associated therewith will become conductive and forces the state of the control line L1 to zero level to close thereby the transistor T1 that breaks the charging process. The light of the light emitting diode in the associated circuit gives a visual indication of the cause of the break. The conductive state of the thyristors Th2–Th5 persists until the current is broken. The transistor T3 performs this task, since it is controlled by the circuit shown in FIG. 5, which relates to the conditional restart function.

The base of the transistor T3 is connected through a diode and a resistor to the supply voltage +U and a pair of series transistors T4 and T5. A switch S2 is inserted in the series circuit of the transistors T4 and T5. The closed state of this switch enables the restart function, while its open state prohibits it. The base of the transistor T4 constitutes input terminal 5 of the unit, and the positive voltage of this terminal is a precondition of any restart. The input terminal 5 receives a positive voltage if the temperature of the battery $T_B$ decreases below a predetermined acceptable temperature $T_{ok}$, thus $T_B<T_{ok}$. The term "acceptable" should be interpreted from the aspect of capability of the battery for a restarted charging. In an exemplary battery type the values are as follows: $T_{max}=41°$ C., $T_{ok}=37°$ C. These values change with the type of the battery and their values are stored in separate temperature monitoring circuits.

Input terminals 1 to 4 are coupled through OR gates constituted by diodes to the base of the transistor T4, and each of them can be associated with a respective restart condition. These conditions are preferably similar to the stop conditions, but their values need not be identical, since similar to the temperature a certain extent of hysteresis might be preferable. A restart will takes place by the fact that the simultaneous conductive state of the transistors T4 and T5 removes the open state control from the base of the transistor T3 and turns this latter in off state. The break of the current of the transistor T3 breaks the circuit of the thyristor that stopped previously the charging, and the voltage of the control line L1 returns to the positive level and the transistor T1 opens and charging is resumed.

Figure 6:
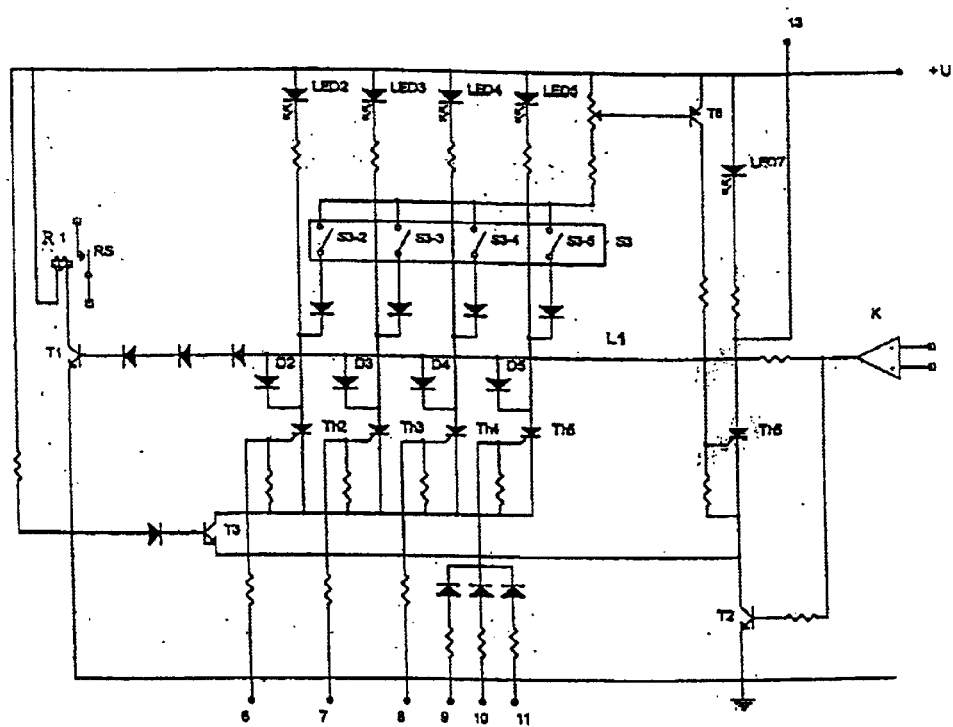
FIG. 6 is the circuit diagram of circuits that change the charging parameters.

The circuits used for changing the charging parameters are shown in FIG. 6. The power controller SK shown in FIG. 1 has preferably input P2 for adjusting a second mode of operation. If this input is controlled, the charging process is continued at a power level, which is lower than the original one. If the battery B to be charged is not defective, then the charging process is started at the first switching on, and the first stop condition will probably occur when the battery has been charged to a significant portion of its capacity. Thereafter a lower level charging is sufficient, and this requires a second mode for the charging circuit CH. In the circuit shown in FIG. 6 the input P2 is controlled by output terminal 13 of the circuit. The terminal 13 is coupled to anode of a thyristor Th6 inserted in the collector circuit of the transistor T2. A light emitting diode LED 7 is also inserted in this circuit to indicate the active state of this mode.

An npn-type transistor T6 is coupled between the collector of the transistor T2 and the supply voltage +U. The control electrode of the thyristor Th6 is coupled to the junction of a voltage divider coupled between the collector of the transistor T6 and the collector of the transistor T2. The base of the transistor T6 is connected to a common contact terminal of switch S3 that comprises four independent pair of contacts. The other contacts of the switch S3 are connected through respective decoupler diodes to the anodes of the thyristors Th2–Th5. In case if any conditional stop becomes active, and the associated contact of the switch S3 is closed, the emitter-to-basis voltage of the transistor T6 increases. As a result, the transistor T6 becomes conductive and its current passes a positive voltage to the control electrode of the thyristor Th6, it opens and controls the output terminal 13 and the input P2 with a positive voltage. The precondition of the second mode is established already at the stop condition prior to any restart, however, it can have an effect at the subsequent restarted mode only.

Figure 7:
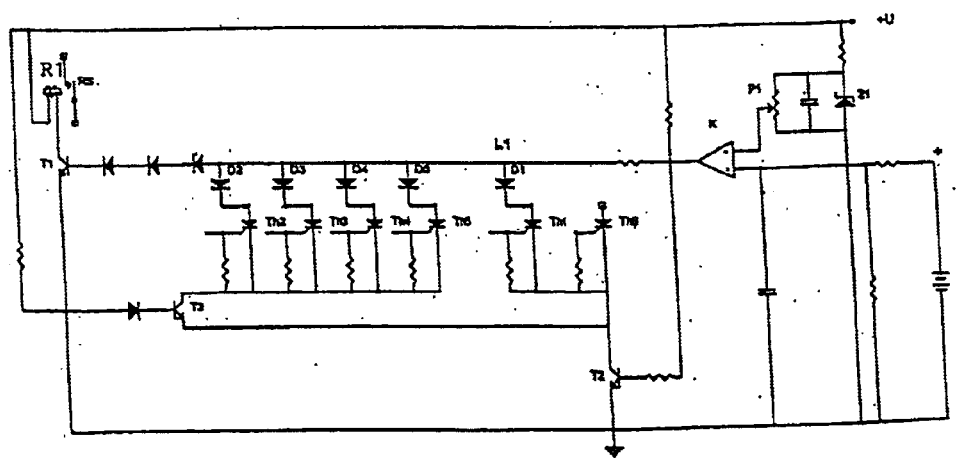
FIG. 7 is a portion of the circuits that return the unit in the basic state.

FIG. 7 shows the circuit detail that returns the unit into initial state. From the previous description the conditions have been explained which are connected with the temporary or final stop of charge and with the activation of the second power mode. In FIG. 7 a common property of these circuits will become clear, namely that the persistence of all of these conditions depend finally on the positive state of the comparator K and from the open state of the transistor T2 also controlled by the comparator K. If at the end of the charging process the battery B is removed, the comparator K changes its state and all circuits of the central control unit returns to the initial state and will be ready to a new charging process. This means the no one of the thyristors can remain conductive, and no current will flow through any of the transistors T1 and T2, whereby the central control unit is set into a waiting (standby) mode. The subsequent operations require the existence of the starting conditions.

The central control unit can be used preferably in such a further mode, in which the charging circuit CH is controlled by the power controller SK with adjustable rising and decaying slope. Such a controller is described in my Hungarian patent 210725 which is capable of adjusting the power of any circuit fed from the line voltage. This is achieved by changing the flowing angle of the alternating power feeding the circuit that constitutes now the load within a predetermined angular range e.g. between 10° and 270°. The flowing angle is first increased starting from the lower limit of the range till the upper limit, and its is decreased in reverse direction. The rate of increase and decrease as well as the angular range limits can be adjusted freely. In the increasing sections the power switched to the battery increases, and in the decreasing sections it decreases. In case of using such a power controller the operation of the central control unit should be modified only in a slight extent. The two states of the relay R1 should be connected to the control inputs of the power controller SK associated with the increasing and decreasing powers, respectively. This means that in case of a conditional stop instead of an immediate switching off a gradually decreasing power is fed to the battery B. The automated start or the restart mode controls again the increasing power mode. A full switch off will be resulted from the unconditional stop states, i.e. if either of the conditions $U_B<U_o$ or $I_{ch}>I_{max}$ are met.

The central control unit according to the invention can be used owing to its universal character in case of all battery charging tasks, it takes into account the specific properties of the batteries and of their charging processes, whereas its circuit design is very simple.

What is claimed is:

1. A control unit for controlling the charging process of a battery, comprising:
    (a) a charger circuit coupled to the battery;
    (b) a circuit for prohibiting said charging process when at least the following conditions recited in paragraphs (i) and (ii) below are both met:
        (i) $T_B>T_{max}$, where $T_B$ designates the actual temperature of the battery and $T_{max}$ designates the highest permissible battery temperature, and
        (ii) in addition to the condition of paragraph (i) above being met, at least one of the following three conditions of paragraph I, II or III are met;
            (I) if the battery voltage $U_B$ lies below a predetermined threshold value $U_o$
            (II) if the charging current $I_{ch}$ exceeds a predetermined maximum value $I_{max}$, or
            (III) an end-of-charge condition,
    wherein said end-of-charge condition is generated when a change in either the battery current or voltage, dI or dU, respectively, decreases within a predetermined time period below a respective predetermined threshold level;
        said prohibiting circuit comprising respective conditional and final prohibition circuits, wherein said final prohibition circuit is triggered by the following two of said conditions, namely, the battery voltage $U_B$ lies below a predetermined threshold value $U_o$ and the charging current $I_{ch}$ exceeds a predetermined maximum value $I_{max}$;

said conditional prohibition circuit being triggered by any one of said prohibition conditions, said central control circuit further comprising a restart circuit for restarting a conditionally prohibited charging process, said restart circuit comprising a plurality of inputs through which respective restart signals can be received, said restart circuit being responsive to said restart signals to trigger restart of operation of said charger circuit in response to the temperature of the battery ($T_B$) being lower than an acceptable predetermined temperature ($T_{ok}$), said restart signals controlling control unit operations for the same respective parameters as those constituting said conditional prohibitions, actual trigger values of the restart condition being separated from trigger values associated with conditional prohibition parameters to define a hysteresis characteristic.

2. The control unit as claimed in claim 1, further comprising a comparator circuit (K) monitoring the inequality $U_B<U_o$, and having an output coupled to a control line (L1), said semiconductor switch (T1) controlling the operation of said charger and having a control electrode connected to said control line (L1) for disconnecting the charging process if said inequality is detected.

3. The control unit as claimed in claim 1, wherein the final stop circuit comprises a thyristor (Th1) having a control electrode connected to an input (12) receiving the final prohibition condition signal, and said final stop circuit is broken upon removal of the battery only.

4. The control unit as claimed in claim 1, wherein said conditional prohibition circuit comprises thyristors (Th2 to Th5) each associated with a respective one of said conditional prohibition parameters and having associated therewith anode to cathode circuitry, and the control electrodes of said thyristor being connected to prohibition inputs (6 to 11) receiving signals of said conditions, and the anode to cathode circuitry of said thyristors being coupled to the control input of a switch (R1) controlling the charging circuit (CH) to disable the same when being activated.

5. The control unit as claimed in claim 6, wherein the main circuits of said thyristors (Th2 to Th5) in the conditional prohibition circuit are connected in a series with said restart circuit that comprises a pair of transistors (T4, T5) connected in a series, one being controlled by the condition $T_B<T_{ok}$, and the other one in the pair being controlled through an OR gate by all other conditional restart inputs (1 to 4).

6. The control unit as claimed in claim 1, further comprising switches (S3), and a further thyristor (Th6), wherein the respective stop inputs of said conditional prohibition circuit being connected through said switches (S3) to the control electrode of this further thyristor (Th6), said charger circuit (CH) having a mode selector input adjusting a second charging mode with decreased charging power, and the further thyristor (Th6) when being set into conductive state enabling said second charging mode, and this conductive state being maintained till the end of the battery charging process.

7. The control unit as claimed in claim 1, comprising a manually operated override switch (S1) allowing the commencement of the charging process in spite of an existing final prohibition command generated because of the low level of the battery voltage to enable manual starting, whereby the low battery voltage is allowed to increase above the threshold value $U_o$.

8. The control unit as claimed in claim 1, comprising a charge power controller (SK) connected to said charging circuit (CH) to supply alternating power thereto with variability, wherein said prohibition modes said charge power controller (SK) being controlled to continuously decrease the charging rate, and in said charging mode the charging rate is continuously increased.

9. A Central control unit for controlling the charging process of a battery, comprising:

(a) a charger circuit coupled to the battery;

(b) a circuit for prohibiting said charging process when at least the following conditions recited in paragraphs (i) and (ii) below are both met:

(i) $T_B>T_{max}$, where $T_B$ designates the actual temperature of the battery and $T_{max}$ designates the highest permissible battery temperature, and (ii) in addition to the condition of paragraph (i) above being met, at least one of the following three conditions of paragraph I, II or III are met;

(I) if the battery voltage $U_B$ lies below a predetermined threshold value $U_o$ (II) if the charging current $I_{ch}$ exceeds a predetermined maximum value $I_{max}$, or (III) an end-of-charge condition, wherein said end-of-charge condition is generated when a change in either the battery current or voltage, dI or dU, respectively, decreases within a predetermined time period below a respective predetermined threshold level.

* * * * *